(12) United States Patent
Majumdar et al.

(10) Patent No.: US 12,288,369 B2
(45) Date of Patent: Apr. 29, 2025

(54) SERVER SYSTEMS AND METHODS USING VISION AI FOR DATA COLLECTION

(71) Applicant: AVEVA SOFTWARE, LLC, Lake Forest, CA (US)

(72) Inventors: Arijeet Majumdar, Cypress, TX (US); John Leighton, Chicago, IL (US); Shreeya Mody, Somerset, NJ (US); Karan Zavar, Houston, TX (US)

(73) Assignee: Aveva Software, LLC, Lake Forest, CA (US)

( * ) Notice: Subject to any disclaimer, the term of this patent is extended or adjusted under 35 U.S.C. 154(b) by 310 days.

(21) Appl. No.: 17/952,878

(22) Filed: Sep. 26, 2022

(65) Prior Publication Data

US 2024/0104878 A1    Mar. 28, 2024

(51) Int. Cl.
*G06V 10/22* (2022.01)
*G06V 10/10* (2022.01)

(52) U.S. Cl.
CPC ............ *G06V 10/225* (2022.01); *G06V 10/10* (2022.01)

(58) Field of Classification Search
CPC .............................. G06V 10/255; G06V 10/10
See application file for complete search history.

(56) References Cited

U.S. PATENT DOCUMENTS

| | | | |
|---|---|---|---|
| 7,180,422 B2* | 2/2007 | Milenkovic | G08B 21/0261 340/8.1 |
| 7,246,746 B2* | 7/2007 | McNamara | G06Q 10/00 235/383 |
| 8,344,879 B2* | 1/2013 | Harmon | G08B 21/24 455/456.1 |

\* cited by examiner

*Primary Examiner* — Elias Desta
(74) *Attorney, Agent, or Firm* — Dergosits & Noah LLP; Todd A. Noah

(57) ABSTRACT

A system for automatically associating an image with an asset tag which includes a historian server system. A path command is sent to a mobile asset, the path command comprising instructions that enable the mobile asset to travel along a path to an instrumented asset. A collection command is sent to the mobile asset to collect asset data comprising a digital representation of the instrumented asset and send the asset data to one or more computers. The asset data can also comprise an instrument asset identification, one or more instrument data values indicative of a physical parameter of the instrumented asset, and a time stamp comprising an approximate time of collection command execution. The system generates a tag value comprising an asset link between the one or more instrument data values, the instrument identification, and the time stamp.

18 Claims, 8 Drawing Sheets

SERVER SYSTEMS AND METHODS USING VISION AI FOR DATA COLLECTION

BACKGROUND

Reducing carbon emissions are an important part of many companies' plans for protecting the environment. Currently, stranded or unmonitored instrumented assets can represent 40% to 60% of all instrumented assets in an industrial system. Older industrial complexes that were built without remote instrumentation would typically need significant investments in both physical equipment and software to bring monitoring up to current standards. In some situations, it is simply not feasible or economical to upgrade unmonitored, instrumented assets to transmit data to a historian system. Accordingly, current detection methods are only able to identify system failures by their effect on components that are monitored or, in a worst-case scenario, by a catastrophic event. In many cases, these failures can be prevented if the assets are monitored and analyzed on a regular schedule. Human operators are sometimes used to manually inspect assets, but human error during manual data collection can also result in catastrophic consequences.

Therefore, there is a need in the art for a system that can monitor, record, and transmit measurement outputs from existing instrumented assets using measurement receivers transported by mobile assets.

SUMMARY

In some embodiments, the system includes one or more instrumented assets that include one or more measurement instruments (e.g., pressure gauges, level meters, temperature gauges, and/or any type of gauge or sensor). In some embodiments, the one or more measurement instruments include one or more measurement outputs which can be purely digital, a hybrid of digital and analog, or purely analog.

As used herein, a measurement output is defined as any structure that is configured to provide an analog and/or digital measured value through a visual display and/or digital signal. In some embodiments, a non-limiting example of a visual display includes a gauge with a movable needle that points to a printed measurement value or other indicator on a physical surface. In some embodiments, a non-limiting example of a visual display includes a display with an arrangement of structures that form the shape of one or more characters (e.g., using light emitting diodes or other devices). In some embodiments, a visual display is any conventional display configured to present and/or project information in a way that can be interpreted by a human and/or computer (e.g., bar codes, quick response ("QR") codes, or any other display technology). In some embodiments, non-limiting examples of digital signals include electrical signals transmitted over a wired connection (e.g., a cable) and/or a wireless connection (e.g., radio frequency, Wi-Fi, Bluetooth®). In some embodiments, a digital signal is any (conventional) signal that can be received and/or interpreted by a computer. In some embodiments, a measurement output includes an abnormal condition such as a missing component or component part, a leak and/or any difference between one or more images that can be visually identified.

In some embodiments, the system includes one or more measurement receivers. As used herein, a measurement receiver is defined as a structure configured to record a measurement output. In some embodiments, a non-limiting example of a measurement receiver includes a camera configured to record visual images as one or more of photographs, film, and/or analog or digital video signals. In some embodiments, a non-limiting example of a measurement receiver includes a digital receiver configured to receive electronic signals over a wired connection (e.g., a cable) and/or a wireless connection (e.g., Wi-Fi or Bluetooth® or other wireless communications protocols).

In some embodiments, the system is configured to use the one or more measurement receivers to capture, store, and/or transmit the one or more measurement outputs of the one or more measurement instruments. In some embodiments, the one or more measurement receivers are connected to and/or are integral to one or more mobile assets. As used herein, a mobile asset is defined as a person or machine configured to transport one or more measurement receivers. In some embodiments, a mobile asset includes one or more machines. In some embodiments, mobile machines include machines that move autonomously and/or can be controlled manually from a proximate and/or remote location. In some embodiments, non-limiting examples of mobile assets include one or more of: drones (e.g., propellor and/or wheel driven), robots, and vehicles (e.g., cars, trucks, and boats). In some embodiments, a mobile asset includes a human operator carrying one or more measurement receivers (e.g., body cameras and/or radio frequency (RF) receivers).

In some embodiments, the system is configured to use the mobile assets that include the one or more measurement receivers to obtain data from inaccessible or hard to reach areas. For example, some embodiments include a drone that can fly to a water storage tank located on top of a building. In one non-limiting example, the drone is equipped with a camera and is configured to record an image of a fluid level gauge attached to the water storage tank and store the image on memory and/or transmit the image for further processing as described herein according to some embodiments. In another non-limiting example, the drone is equipped with a Wi-Fi receiver that records and image transmitted by a Wi-Fi transmitter connected to a stationary camera pointed at the fluid level gauge. In some embodiments, the mobile assets are configured to autonomously and periodically obtain data by traveling to a data source on a predetermined schedule or as manually mobilized.

In some embodiments, one or more mobile assets are configured to transmit and/or download the one or more measurement outputs to a historian server system. In some embodiments, the historian server system is configured to analyze the one or more measurement outputs. In some embodiments, the historian server system is configured to automatically identify one or more asset tags associated with the one or more instrumented assets using visual and/or digital information associated with the instrumented assets and/or measurement outputs and automatically associate the one or more measurement outputs with one or more tags. In some embodiments, the system is configured to use the one or more measurement outputs in predictive analytics, advanced analytics, and/or process optimization as further described herein.

In some embodiments, the disclosure is directed to system for automatically associating an image with an asset tag according to some embodiments. In some embodiments, the system comprises a historian server system comprising one or more computers comprising one or more processors and one or more non-transitory computer readable media, the one or more non-transitory computer readable media comprising instructions stored thereon that when executed cause the historian server system to execute one or more computer implemented steps. In some embodiments, the one or more computer implemented steps cause the one or more computers to send, by the one or more processors, a path command to a mobile asset, the path command comprising instructions that enable the mobile asset to travel along a path to one or more instrumented assets. In some embodiments, the one or more computer implemented steps cause the one or more computers to execute, by the one or more processors, a collection command for the mobile asset to collect and send asset data to the one or more computers. In some embodiments, the one or more computer implemented steps cause the one or more computers to receive, by the one or more processors, the asset data from the mobile asset, the asset data comprising a digital representation of the one or more instrumented assets.

In some embodiments, the asset data comprises an instrument identification, the instrument identification identifying the instrumented asset. In some embodiments, the asset data comprises one or more instrument data values, the one or more instrument data values indicative of a physical parameter of the instrumented asset. In some embodiments, the asset data comprises a time stamp, the time stamp comprising at least an approximate time the collection command was executed.

In some embodiments, the one or more computer implemented steps cause the one or more computers to generate, by the one or more processors, a tag value comprising an asset link between the one or more instrument data values, the instrument identification, and the time stamp. In some embodiments, the one or more computer implemented steps cause the one or more computers to add, by the one or more processors, the tag value to an asset tag as an asset time series data value, the asset tag comprising a plurality of asset time series data values for the instrumented asset.

In some embodiments, the asset data comprises one or more images of an instrument data display of the instrumented asset. In some embodiments, the one or more computer implemented steps cause the one or more computers to execute, by the one or more processors, a read command, the read command configured to obtain the one or more instrument data values from the one or more images. In some embodiments, at least one of the one or more images comprise a picture. In some embodiments, at least one of the one or more images comprise a video.

In some embodiments, the asset data comprises one or more images of a computer readable code. In some embodiments, the one or more computer implemented steps cause the one or more computers to execute, by the one or more processors, a read command, the read command configured to obtain the instrument identification from the computer readable code. In some embodiments, the computer readable code comprises a quick response (QR) code. In some embodiments, the computer readable code comprises a bar code.

In some embodiments, the one or more computer implemented steps cause the one or more computers to execute, by the one or more processors, a link between the one or more images and the asset time series data value. In some embodiments, the one or more computer implemented steps cause the one or more computers to display, by the one or more processors, a graphical user interface comprising the plurality of asset time series data values. In some embodiments, the one or more computer implemented steps cause the one or more computers to enable, by the one or more processors, the asset time series data value to be selected by a user. In some embodiments, the one or more computer implemented steps cause the one or more computers to display, by the one or more processors, the one or more images and/or a link to the one or more images in response to the user selecting the asset time series data value.

In some embodiments, the one or more computer implemented steps cause the one or more computers to send, by the one or more processors, the asset tag to an analytics platform, the analytics platform configured to generate statistical data and/or reports for the asset tag. In some embodiments, the system includes artificial intelligence (AI) configured to process unstructured information in the form of an image and convert the unstructured information into structured data that can be analyzed by the system and provide performance and/or efficacy updates for the instrumented asset and/or one or more portions of an associated industrial system.

In some embodiments, the one or more computer implemented steps cause the one or more computers to send, by the one or more processors, a mobile asset global position, the mobile asset global position comprising a time the collection command was executed. In some embodiments, the asset link further comprises a link between the one or more instrument data values, the instrument identification, the time stamp, and the mobile asset global position. In some embodiments, the one or more computer implemented steps cause the one or more computers to identify, by the one or more processors, the instrumented asset using the mobile asset global position.

DRAWING DESCRIPTION

Figure 3:
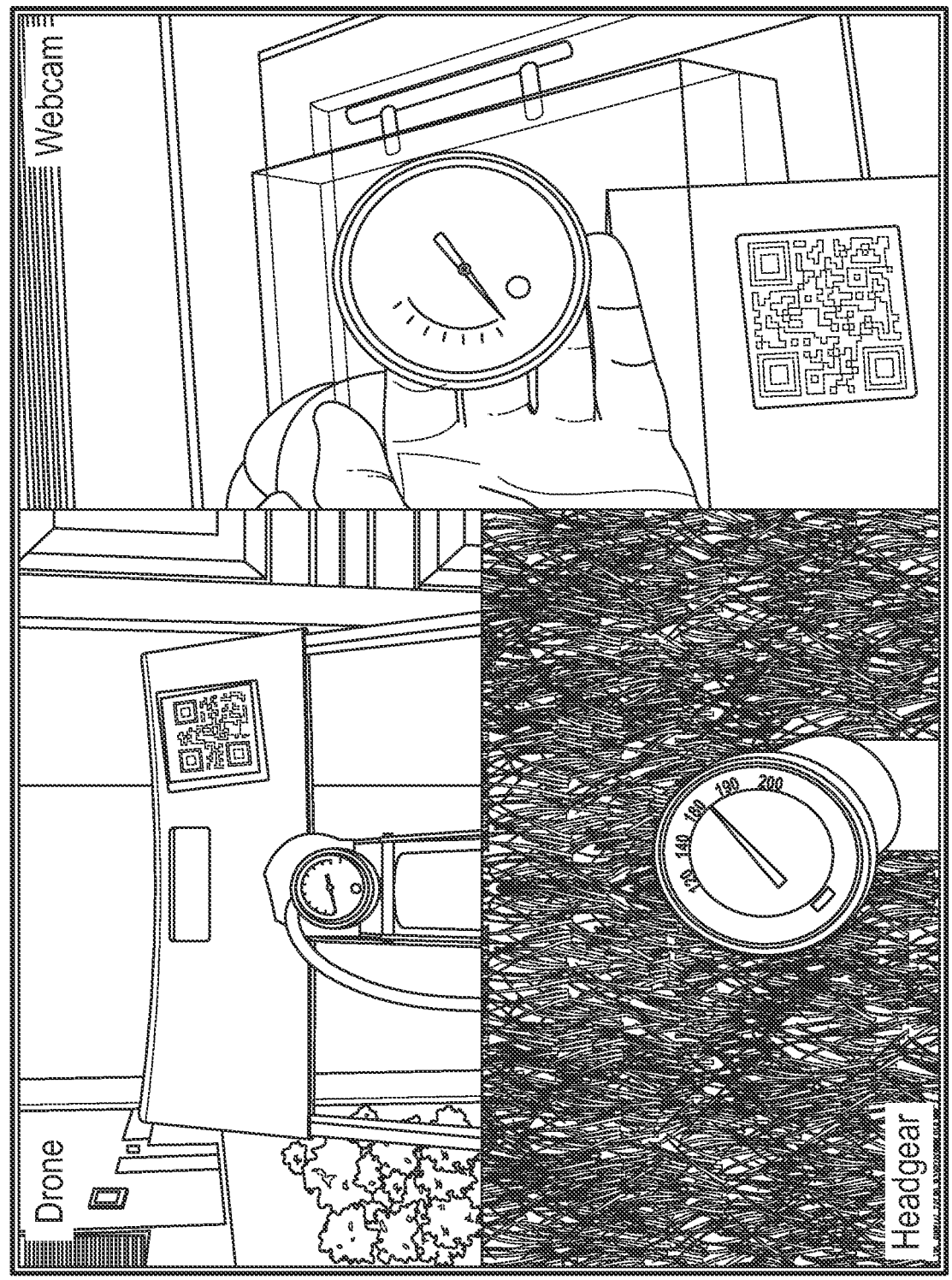

FIG. 3 demonstrates the ability of the mobile asset to capture a QR code and display reading from various angles.

Figure 4:
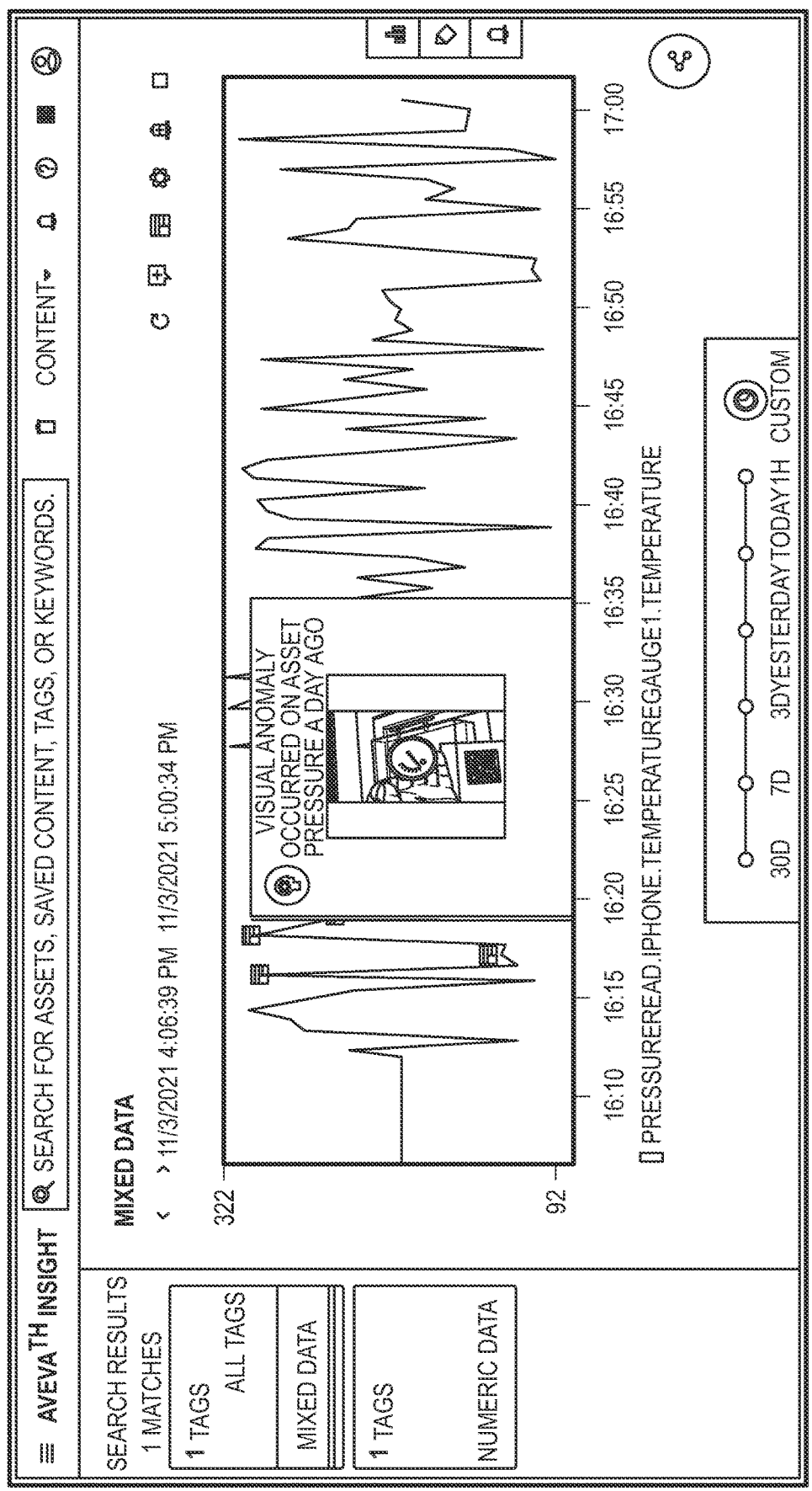

FIG. 4 is a screenshot showing a graphical user interface (GUI) displaying the image of the instrumented asset as well as the corresponding AI interpreted value.

Figure 5:
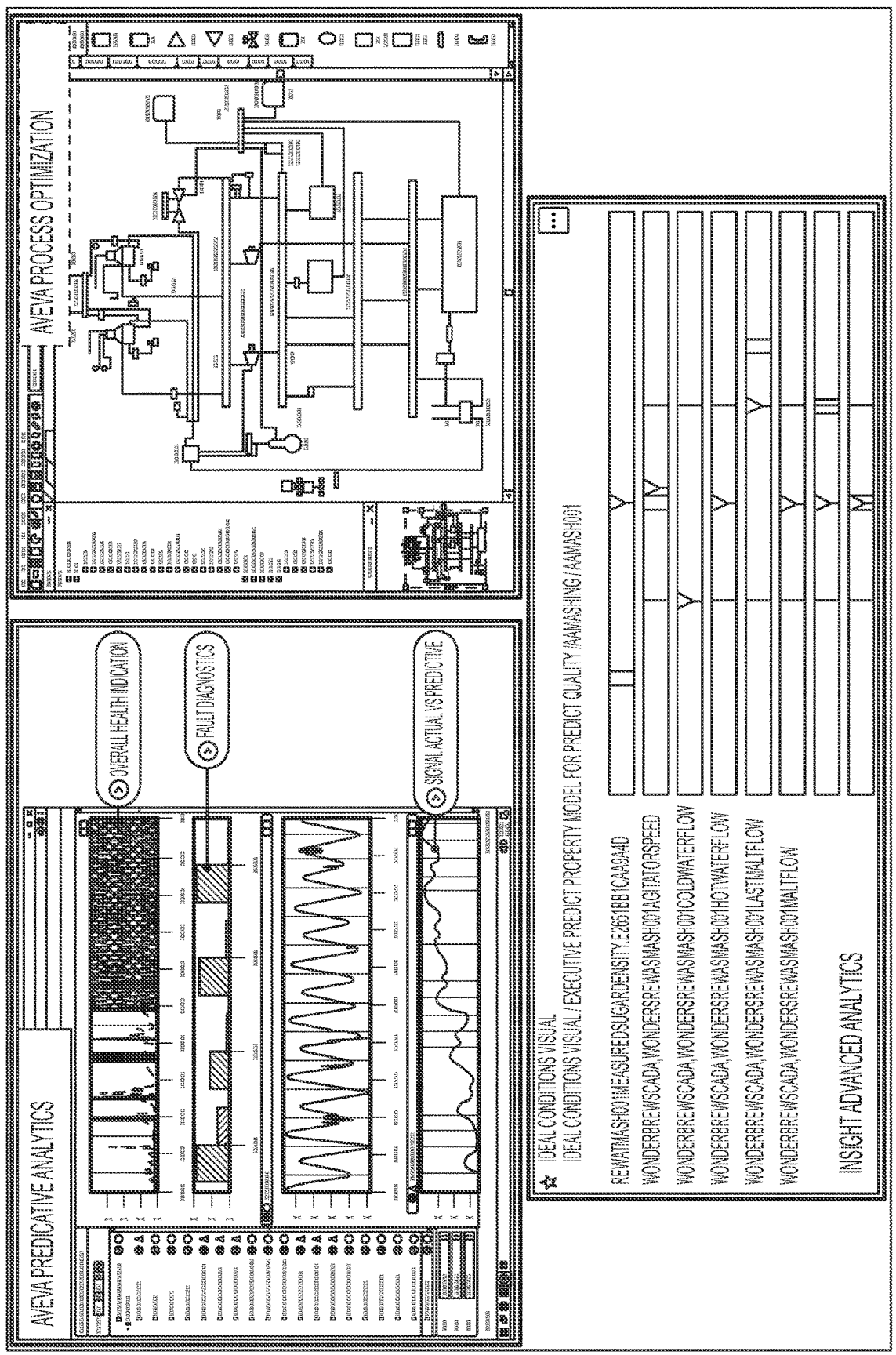

FIG. 5 shows various analyses performed by the historian server system according to some embodiments.

Figure 6:
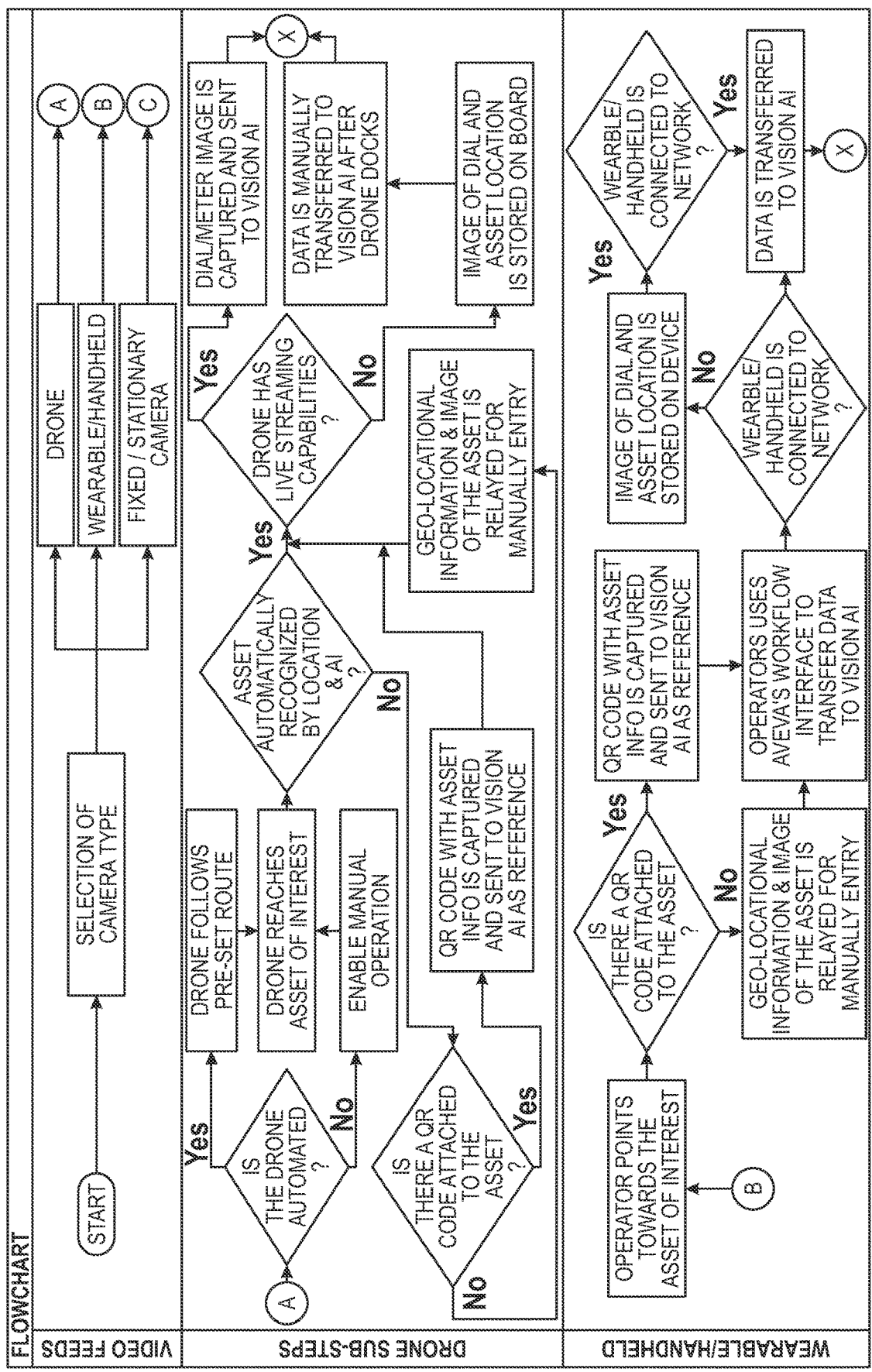

FIG. 6 shows a flowchart of system executed steps according to some embodiments.

Figure 7:
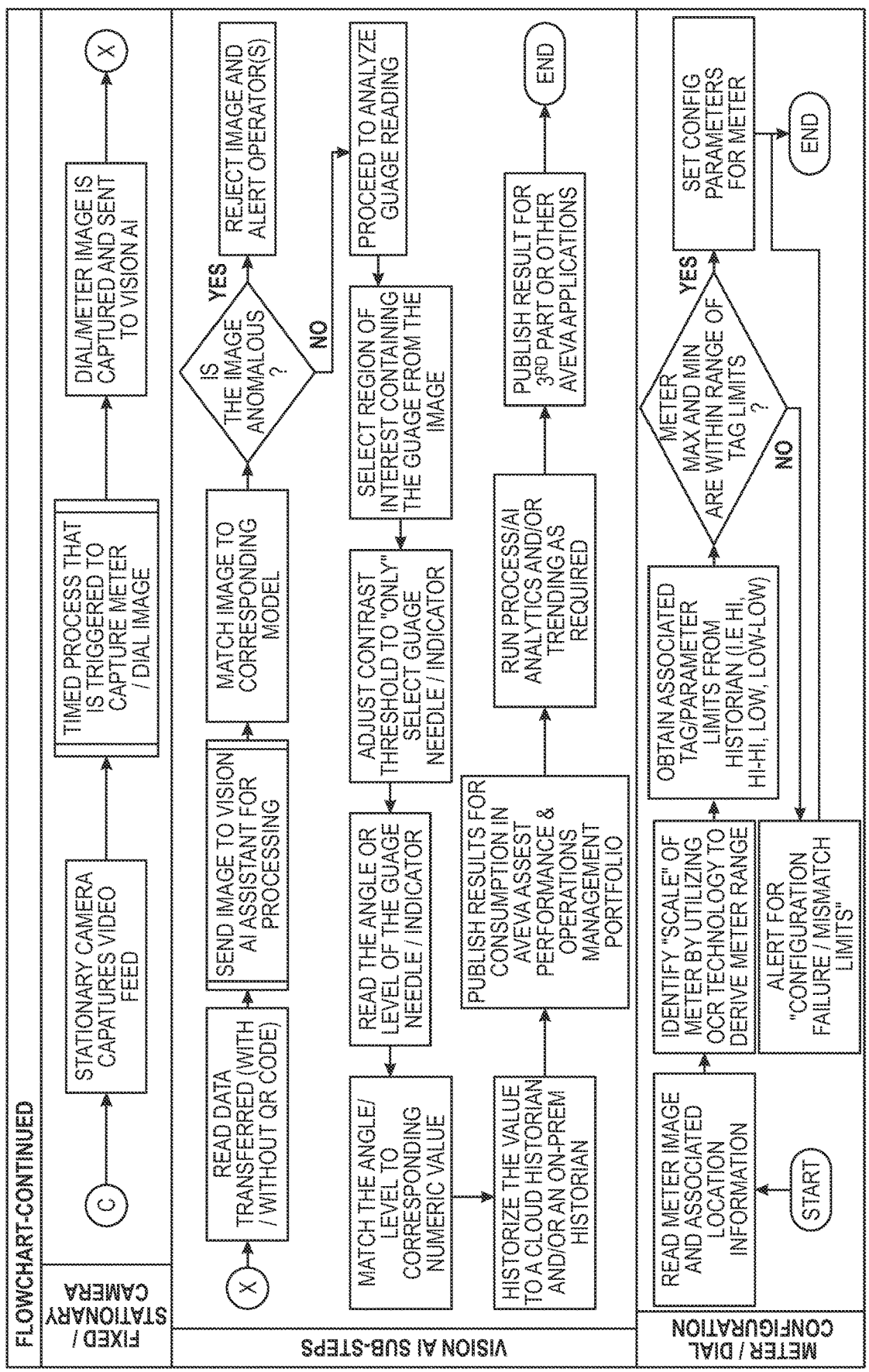

FIG. 7 is a continuation of the FIG. 6 flowchart.

Figure 8:
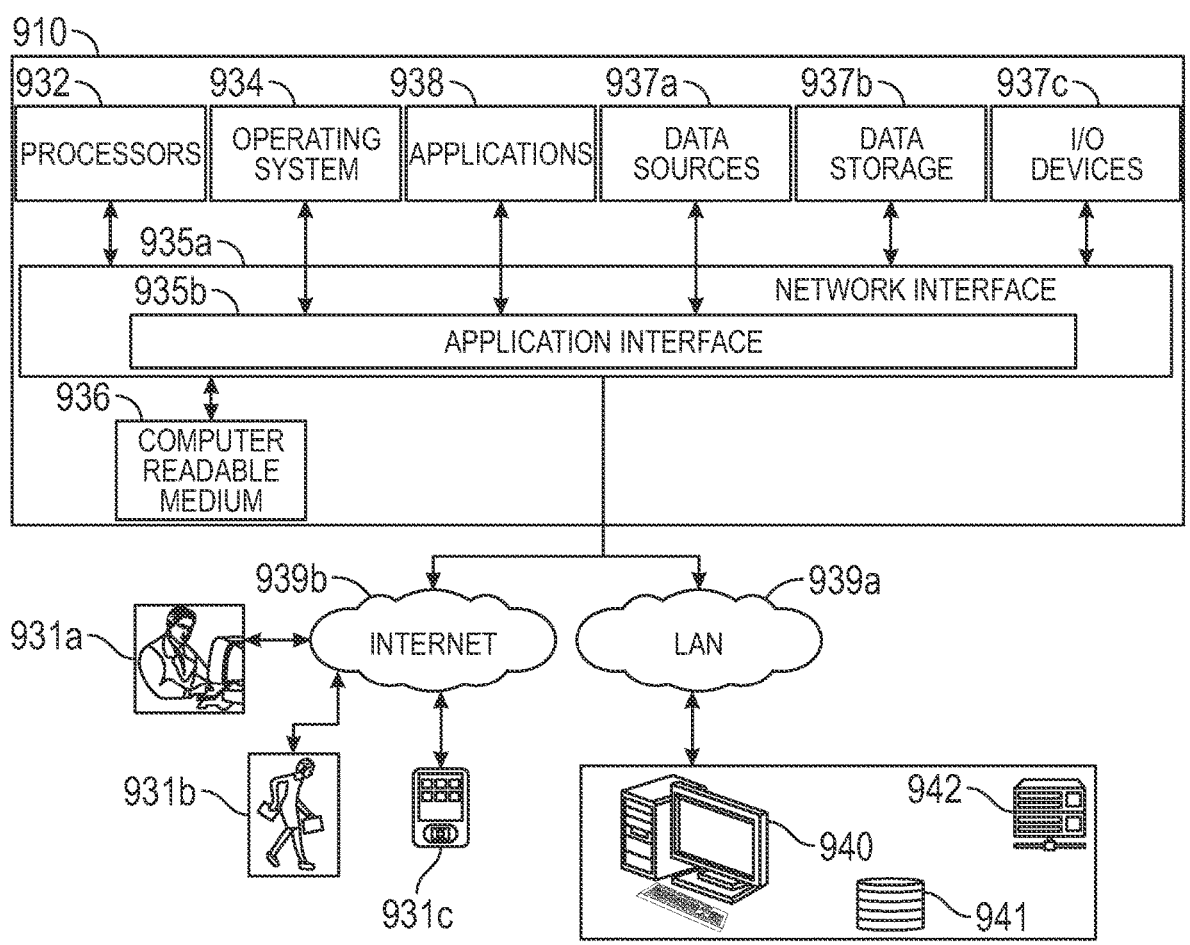

FIG. 8 illustrates a computer system 910 enabling or comprising the systems and methods in accordance with some embodiments of the system.

DETAILED DESCRIPTION

Figure 1:
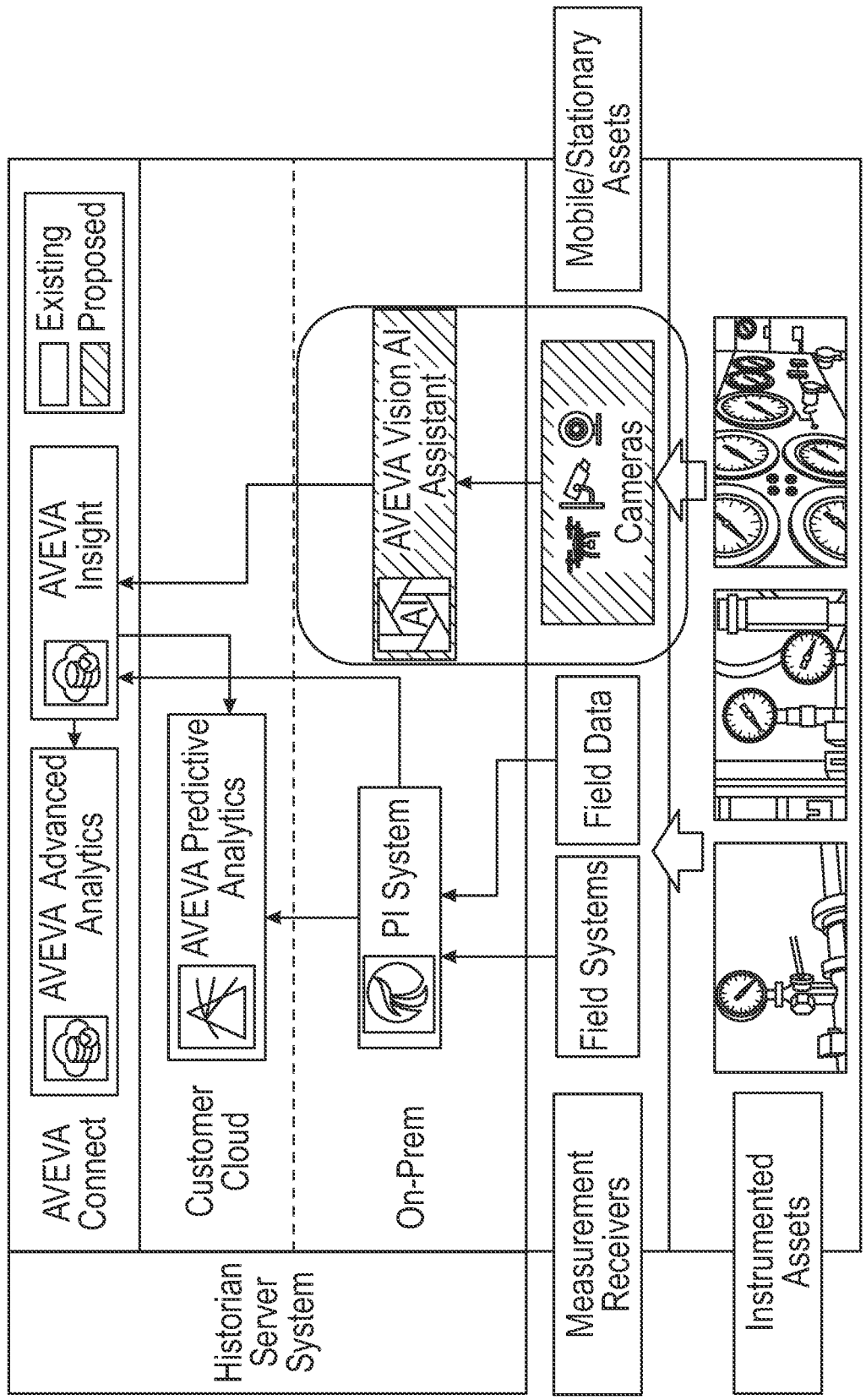
FIG. 1 shows a simplified diagram of system architecture according to some embodiments.

In some embodiments, using mobile assets can result in significant industrial system efficiency gains (e.g., around 33%) and/or reductions in inspection cost (e.g., around 50%). FIG. 1 shows a simplified diagram of system architecture according to some embodiments. In some embodiments, the system is configured to use a mobile camera to capture one or more images of an instrument associated with an instrumented asset. In some embodiments, the system is configured to receive the one or more images and extract one or more values from the instrument. In some embodiments, the system is configured to send the one or more values to a historian server system. In some embodiments, at least a portion of the historian server system is located at an industrial site. In some embodiments, at least a portion of the historian server system is located on a cloud server.

In some embodiments, the historian server system comprises a reporting platform. In some embodiments, the reporting platform is configured to associate data with tags and/or generate reports including data models, charts and graphs. AVEVA PI system is non-limiting example of a suitable reporting platform according to some embodiments.

In some embodiments, the historian server system comprises an image conversion platform. In some embodiments, the image conversion platform is configured to monitor real-time image streams and/or receive one or more images and generate a notification that includes one or more identified abnormalities. AVEVA Vision AI Assistant is a non-limiting example of an image conversion platform according to some embodiments.

In some embodiments, the historian server system comprises a predictive analytics platform. In some embodiments, the predictive analytics platform is configured to execute one or more statistical and model based analysis for industrial process monitoring and diagnostics. AVEVA Predictive Analytics is a non-limiting example of a suitable analytics platform according to some embodiments.

In some embodiments, the system comprises an integration platform. In some embodiments, the integration platform is configured to consolidate information from multiple sources into a single platform for cumulative analysis. In some embodiments, the integration platform is configured to integrate communication between multiple information sources. AVEVA Insight is a non-limiting example of an integration platform according to some embodiments.

In some embodiments, the system includes and advanced analytics platform. In some embodiments, the advanced analytics platform. In some embodiments, the advanced analytics platform is configured to provide early warning and diagnostics for assets before asset failure. AVEVA Advanced Analytics is a non-limiting example of a suitable advances analytics platform according to some embodiments.

Figure 2:
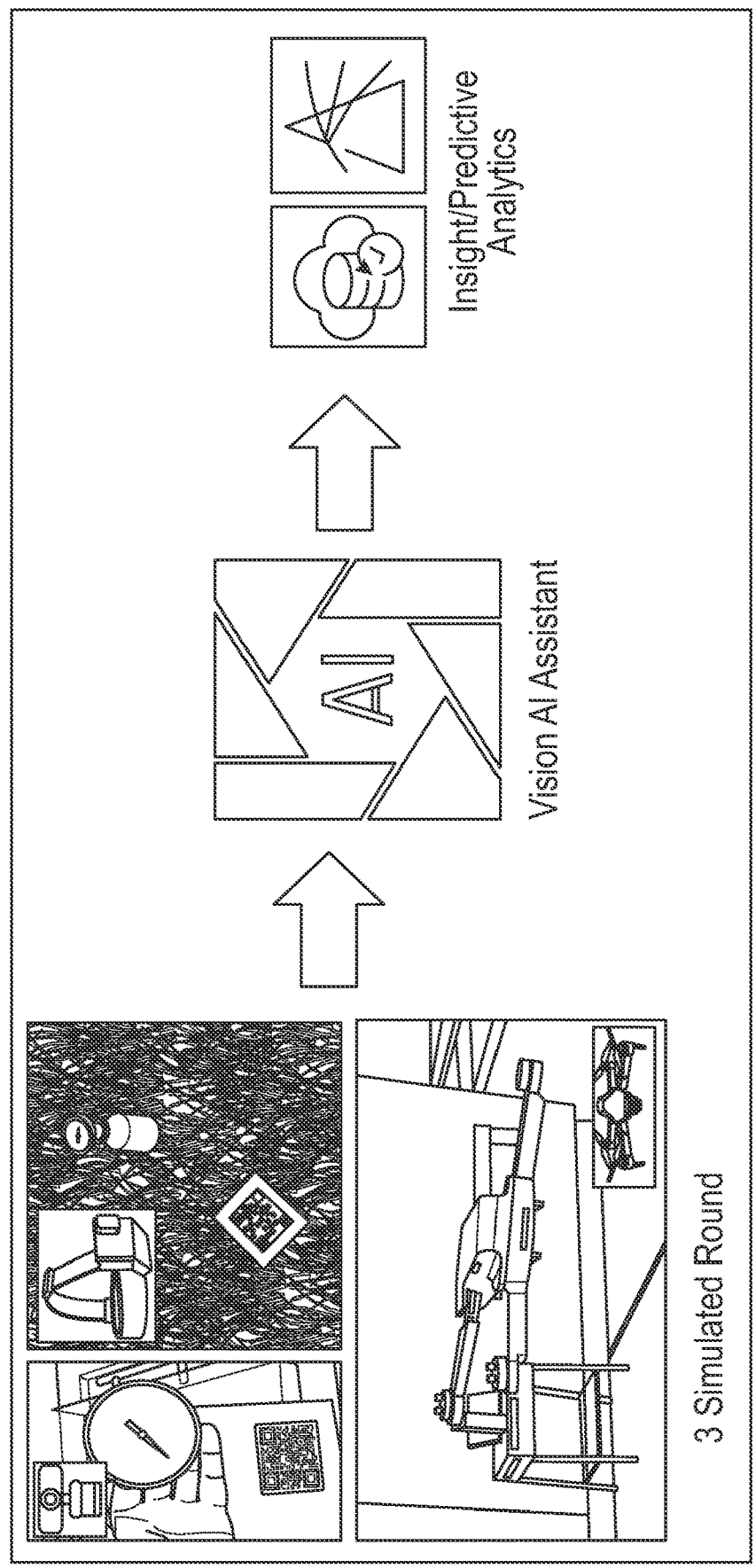
FIG. 2 shows the system implemented with a flying drone as a mobile asse according to some embodiments.

FIG. 2 shows the system implemented with a flying drone, a head mounted camera, and/or a shoulder mounted camera as mobile assets according to some embodiments. In some embodiments, the system includes a QR code or other asset identifier associated with the instrumented asset. In some embodiments, the mobile asset is configured to execute instructions that cause the mobile asset to scan a QR code that corresponds to the instrumented asset. In some embodiments, the system is configured to scan the QR code using one or more cameras and/or scanners integrated into one or more mobile assets at least one of before, after, and/or during a capturing an image of the instrumented asset's display reading and/or environment. In some embodiments, the system is configured to use the QR code to associate the asset's tag with the measurement output.

In some embodiments, the system includes artificial intelligence (AI) configured to process unstructured information in the form of an image and convert the unstructured data into structured data that can be analyzed by the system and provide performance and/or efficacy updates for the instrumented asset and/or one or more portions of an associated industrial system. In some embodiments, the AI is configured to analyze two or more received and/or stored images to identify changes in the instrumented assets and/or changes in the instrumented asset's environment that could indicate a failure or some type of malfunction or abnormal operation. In some embodiments, the system is configured to automatically notify an operator and/or display the abnormal image in one or more reports and/or charts. FIG. 3 demonstrates the ability of the mobile asset to capture a QR code and display reading from various angles according to some embodiments.

In some embodiments, one or more mobile assets are configured to transmit and/or download the one or more measurement outputs to a historian server system. In some embodiments, the historian server system is configured to automatically associate the one or more measurement outputs with a tag corresponding to the instrumented asset. FIG. 4 is a screenshot showing a graphical user interface (GUI) displaying an image of the instrumented asset as well as the corresponding (AI) interpreted value. In some embodiments, the historian server system is configured to display the image of the instrumented asset when a corresponding data value is selected, which provides the benefit of enabling a user to verify the accuracy of the AI interpreted value. In some embodiments, the system is configured to display metadata associated with the mobile asset that includes, as non-limiting examples, a name, type, location, time, and date associated with the mobile asset at the time the one or more measurement outputs were obtained. In some embodiments, the AI interpreted value verification includes a process whereby verification feedback is used to enhance the AI system's performance.

FIG. 5 shows various analyses performed by the historian server system according to some embodiments. In some embodiments, the historian server system is configured to provide predictive analytics that include, as non-limiting examples, overall health indications, fault diagnostics, and actual vs predictive analytics. In some embodiments, the historian server system is configured to provide process optimization analytics configured to determine optimum process setpoints and/or initiate one or more control operations using the one or more measurement outputs. Other analytic programs include advanced analytics that offer greater details on a wide array of parameters for industrial assets.

In some embodiments, the system includes instructions stored on one or more non-transitory computer readable media that when executed cause one or more computers to implement one or more steps. FIG. 6 shows a flowchart of system executed steps according to some embodiments. FIG. 7 is a continuation of the FIG. 6 flowchart.

In some embodiments, the mobile asset has an autonomous, non-autonomous (piloted) mode, and/or a combination mode where the drone can operate autonomously but can also be piloted manually. In some embodiments, the mobile asset includes a global positioning system (GPS) and/or spatial recognition software to navigate to instrumented assets for collecting images to send to the AI. In some embodiments, the mobile asset is configured to associate its current location using the GPS and/or spatial recognition software and does not need a separately placed physical reference (e.g., QR code) to specify the type of instrumented asset. In some embodiments, the mobile asset is configured to send the specific location of where the picture was taken so that the AI system can automatically associate the historian tag with the measurement output.

In some embodiments, the mobile asset (e.g., drone, robot, etc.) is maneuvered (e.g., piloted) into the desired location manually by a user. In some embodiments, once the mobile asset is in position, an image is captured (e.g., video recording, still picture, thermal image, scan, etc.) by the mobile asset of the field instrumentation along with a corresponding QR code near the instrumentation. In some embodiments, the picture and QR code are sent to the AI system whereby the image is analyzed and the asset's tag which is associated with the QR code is updated.

In some embodiments, the benefits autonomous mobile assets provide include: they can be used in situations dangerous for people; they are a cost-effective way of gathering readings over large expanse of territory; they are further cost effective because they can reduce headcount at a plant; the automation reduces the risk of human error; and the automation increases the reliability and repeatability of instrument readings.

In some embodiments, the mobile asset includes a mobile camera carried by an operator. In some embodiments, similar to the drone, the mobile camera includes GPS and/or spatial recognition software and is configured to recognize what field instrumentation is being read and/or can be paired with a QR code to provide information on the specific instrument being read. In some embodiments, the mobile asset is configured to be coupled to a human operator and executes instructions to capture one or more images while the operator moves about the plant. In some embodiments, the mobile asset includes a mobile camera (such as an iPhone®, GoPro®, etc.). In some embodiments, the one or more images along with the QR code and/or GPS information is sent back to a vision AI assistant via a Wi-Fi or 4G/5G connection, as non-limiting examples. In some embodiments, the instrumentation reading is then stored in one or more non-transitory computer readable media of the historian server system along with a GPS location and/or QR code to determine the corresponding tag.

In some embodiments, the mobile asset is configured to notify an operator when they are in proximity of an instrumented asset. In some embodiments, the mobile asset is configured to provide an audible and/or visual queue that provides the operator with instructions for properly capturing an image and/or confirmation that the measurement output has been received. In some embodiments, the system includes an augmented reality (AR) system configured to augment the operator's field of vision with the location of the instrumented asset and any other desired information. In some embodiments, the augmented reality is configured to display one or more measurement output parameters associated with the instrumented asset within the operator's field of view. In some embodiments, the mobile asset is communicatively coupled to a mobile computer that includes a display configured to receive one or more images and/or a video feed sent from the mobile asset.

In some embodiments, a benefit the mobile cameras provide includes the QR code/GPS/Spatial recognition software enabling the operators to input relatively few or the fewest parameters possible onto a log or the mobile computer while making rounds, which increases the safety of the operator in situations where they need both hands to secure themselves in place. For example, if an operator reading requires someone to climb a ladder, then this recognition functionality will maximize the amount of time they can have two hands on the rungs of the ladder. In some embodiments, another benefit mobile cameras provide is reduction of human error, which increases reliability and repeatability of instrument readings.

In some embodiments, at least a portion of the mobile asset system includes a stationary asset. In some embodiments, the stationary asset includes a camera and/or webcam mounted directly in front of an instrumented asset. In some embodiments, the stationary asset is configured to take pre-defined readings of the instrumented asset. In some embodiments, there is no need for a QR code in this case because the system is configured to correspond a region of interest (ROI) in the field of view to a particular field instrument. In some embodiments, the image along with the camera information is sent back to the AI system over a wired and/or wireless communication connection. In some embodiments, at least a portion of the mobile asset (e.g., drone, human mounted camera) is configured to record the measurement output stored on the stationary asset automatically or after manual actuation. In some embodiments, the historian server system is configured to associate the measurement output with a tag by using the camera information to determine what the correct corresponding tag.

In some embodiments, the stationary asset provides the benefit of periodic or nearly continuous data collection and measurement output storage for later download. In some embodiments, other benefits include: the system prevents humans from needing to repeatedly go into dangerous areas; it allows outdated (i.e., disconnected) instrumentation to be digitized at high frequency; it reduces the risk of human error and increases the reliability and repeatability of instrument readings; and is a cost effective way to digitize field instrumentation if replacing the instrument requires retrofitting and/or stopping production to change instrumentation.

FIG. 9 illustrates a computer system 910 enabling or comprising the systems and methods in accordance with some embodiments of the system. In some embodiments, the computer system 910 can operate and/or process computer-executable code of one or more software modules of the aforementioned system and method. Further, in some embodiments, the computer system 910 can operate and/or display information within one or more graphical user interfaces (e.g., HMIs) integrated with or coupled to the system.

In some embodiments, the computer system 910 can comprise at least one processor 932. In some embodiments, the at least one processor 932 can reside in, or coupled to, one or more conventional server platforms (not shown). In some embodiments, the computer system 910 can include a network interface 935a and an application interface 935b coupled to the least one processor 932 capable of processing at least one operating system 934. Further, in some embodiments, the interfaces 935a, 935b coupled to at least one processor 932 can be configured to process one or more of the software modules (e.g., such as enterprise applications 938). In some embodiments, the software application modules 938 can include server-based software and can operate to host at least one user account and/or at least one client account, and operate to transfer data between one or more of these accounts using the at least one processor 932.

With the above embodiments in mind, it is understood that the system can employ various computer-implemented operations involving data stored in computer systems. Moreover, the above-described databases and models described throughout this disclosure can store analytical models and other data on computer-readable storage media within the computer system 910 and on computer-readable storage media coupled to the computer system 910 according to various embodiments. In addition, in some embodiments, the above-described applications of the system can be stored on computer-readable storage media within the computer system 910 and on computer-readable storage media coupled to the computer system 910. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 910 can comprise at least one computer readable medium 936 coupled to at least one of at least one data source 937a, at least one data storage 937b, and/or at least one input/output 937c. In some embodiments, the computer system 910 can be embodied as computer readable code on a computer readable medium 936. In some embodiments, the computer readable medium 936 can be any data storage that can store data, which can thereafter be read by a computer (such as computer 940). In some embodiments, the computer readable medium 936 can be any physical or material medium that can be used to tangibly store the desired information or data or instructions and which can be accessed by a computer 940 or processor 932. In some embodiments, the computer readable medium 936 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 936 can transmit or carry instructions to a remote computer 940 and/or at least one user 931, including a router, private or public network, or other transmission or channel, both wired and wireless. In some embodiments, the software application modules 938 can be configured to send and receive data from a database (e.g., from a computer readable medium 936 including data sources 937a and data storage 937b that can comprise a database), and data can be received by the software application modules 938 from at least one other source. In some embodiments, at least one of the software application modules 938 can be configured within the computer system 910 to output data to at least one user 931 via at least one graphical user interface rendered on at least one digital display.

In some embodiments, the computer readable medium 936 can be distributed over a conventional computer network via the network interface 935a where the system embodied by the computer readable code can be stored and executed in a distributed fashion. For example, in some embodiments, one or more components of the computer system 910 can be coupled to send and/or receive data through a local area network ("LAN") 939a and/or an internet coupled network 939b (e.g., such as a wireless internet). In some embodiments, the networks 939a, 939b can include wide area networks ("WAN"), direct connections (e.g., through a universal serial bus port), or other forms of computer-readable media 936, or any combination thereof.

In some embodiments, components of the networks 939a, 939b can include any number of personal computers 940 which include for example desktop computers, and/or laptop computers, or any fixed, generally non-mobile internet appliances coupled through the LAN 939a. For example, some embodiments include one or more of personal computers 940, databases 941, and/or servers 942 coupled through the LAN 939a that can be configured for any type of user including an administrator. Some embodiments can include one or more personal computers 940 coupled through network 939b. In some embodiments, one or more components of the computer system 910 can be coupled to send or receive data through an internet network (e.g., such as network 939b). For example, some embodiments include at least one user 931a, 931b, is coupled wirelessly and accessing one or more software modules of the system including at least one enterprise application 938 via an input and output ("I/O") 937c. In some embodiments, the computer system 910 can enable at least one user 931a, 931b, to be coupled to access enterprise applications 938 via an I/O 937c through LAN 939a. In some embodiments, the user 931 can comprise a user 931a coupled to the computer system 910 using a desktop computer, and/or laptop computers, or any fixed, generally non-mobile internet appliances coupled through the internet 939b. In some embodiments, the user can comprise a mobile user 931b coupled to the computer system 910. In some embodiments, the user 931b can connect using any mobile computing 931c to wireless coupled to the computer system 910, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of data collection and component control by enabling data collection from remote disconnected instrumented assets. The disclosure describes the specifics of how a machine including one or more computers comprising one or more processors and one or more non-transitory computer readable media implement the system and its improvements over the prior art. The instructions executed by the machine cannot be performed in the human mind or derived by a human using a pen and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Any text in the drawings is part of the system's disclosure and is understood to be readily incorporable into any description of the metes and bounds of the system. Any functional language in the drawings is a reference to the system being configured to perform the recited function, and structures shown or described in the drawings are to be considered as the system comprising the structures recited therein. It is understood that defining the metes and bounds of the system using a description of images in the drawing does not need a corresponding text description in the written specification to fall with the scope of the disclosure.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system. The phrase "configured to" also denotes the step of configuring a structure or computer to execute a function in some embodiments.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for automatically associating an image asset data with an asset tag comprising:
   one or more computers comprising one or more processors and one or more non-transitory computer readable media, the one or more non-transitory computer readable media comprising instructions stored thereon that when executed cause the system to:
   send, by the one or more processors, a path command to a mobile asset, the path command including instructions that enable the mobile asset to travel along a path to an instrumented asset;
   execute, by the one or more processors, a collection command for the mobile asset to collect the asset data and send the asset data to the one or more computers, the asset data being a digital representation of the instrumented asset and including at least an instrument identification identifying the instrumented asset, one or more instrument data values indicative of a physical parameter of the instrumented asset, and a time stamp including at least an approximate time the collection command as being executed; and
   receive, by the one or more processors, the asset data from the mobile asset;
   generate, by the one or more processors, a tag value comprising an asset link between the one or more instrument data values, the instrument identification, and the time stamp; and
   add, by the one or more processors, the tag value to the asset tag as an asset time series data value, the asset tag comprising a plurality of asset time series data values for the instrumented asset.

2. The system of claim 1, further comprising instructions to:
   execute, by the one or more processors, a read command configured to obtain the one or more instrument data values from one or more images of an instrument data display of the instrumented asset, wherein the asset data further comprises the one or more images.

3. The system of claim 2,
   wherein at least one of the one or more images comprise a picture.

4. The system of claim 2,
   wherein at least one of the one or more images comprise a video.

5. The system of claim 1, further comprising instructions to:
   execute, by the one or more processors, a read command configured to obtain the instrument identification from a computer readable code from one or more images included in the asset data.

6. The system of claim 5,
   wherein the computer readable code comprises a quick response (QR) code.

7. The system of claim 5,
   wherein the computer readable code comprises a bar code.

8. The system of claim 2, further comprising instructions to:
   execute, by the one or more processors, a link between the one or more images and the asset time series data value.

9. The system of claim 8, further comprising instructions to:
   display, by the one or more processors, a graphical user interface comprising the plurality of asset time series data values;
   enable, by the one or more processors, the asset time series data value to be selected by a user; and
   display, by the one or more processors, the one or more images and/or a link to the one or more images in response to the user selecting the asset time series data value.

10. The system of claim 1, further comprising instructions to:
    send, by the one or more processors, the asset tag to an analytics platform configured to generate statistical data and/or reports for the asset tag.

11. The system of claim 1, further comprising instructions to:
    process unstructured information as an image; and
    convert the unstructured information into structured data that can be analyzed by the system and provide performance and/or efficacy updates for the instrumented asset and/or one or more portions of an associated industrial system.

12. The system of claim 1, further comprising instructions to:
    send, by the one or more processors, a mobile asset global position comprising a time the collection command was executed.

13. The system of claim 12,
    wherein the asset link further comprises a link between the one or more instrument data values, the instrument identification, the time stamp, and the mobile asset global position.

14. The system of claim 12, further comprising instructions to:
    identify, by the one or more processors, the instrumented asset using the mobile asset global position.

15. A system for automatically associating asset data with an asset tag comprising:
    one or more computers comprising one or more processors and one or more non-transitory computer readable media, the one or more non-transitory computer readable media comprising instructions stored thereon that when executed cause the system to:
    execute, by the one or more processors, a collection command for a mobile asset to collect and send the asset data to the one or more computers; and
    receive, by the one or more processors, the asset data from the mobile asset, the asset data being a digital representation of an instrumented asset and including at least;
    an instrument identification identifying the instrumented asset,
    one or more instrument data values indicative of a physical parameter of the instrumented asset, and
    a time stamp comprising at least an approximate time the collection command as being executed;
    generate, by the one or more processors, a tag value comprising an asset link between the one or more instrument data values, the instrument identification, and the time stamp; and
    add, by the one or more processors, the tag value to an asset tag as an asset time series data value, the asset tag comprising a plurality of asset time series data values for the instrumented asset.

16. The system of claim 15, further comprising instructions to:
- execute, by the one or more processors, a read command configured to obtain the one or more instrument data values from one or more images of an instrument data display of the instrumented asset, wherein the asset data included the one or more images; and
- execute, by the one or more processors, a link between the one or more images and the asset time series data value.

17. The system of claim 16, further comprising instructions to:
- execute, by the one or more processors, a read command to obtain the instrument identification from a computer readable code, wherein the asset data comprises one or more images of a computer readable code.

18. The system of claim 17, further comprising instructions to:
- send, by the one or more processors, the asset tag to an analytics platform, the analytics platform configured to generate statistical data and/or reports for the asset tag.

* * * * *